United States Patent [19]

Friend

[11] Patent Number: 5,692,037
[45] Date of Patent: Nov. 25, 1997

[54] ON DEMAND REAL TIME TELEPHONE BILLING EQUIPMENT

[75] Inventor: Clarence Friend, Orange County, Calif.

[73] Assignee: Cellular Development Systems, Huntington Beach, Calif.

[21] Appl. No.: 414,508

[22] Filed: Mar. 31, 1995

[51] Int. Cl.$^6$ .......................... H04M 11/00; H04M 15/00
[52] U.S. Cl. ........................... 379/114; 379/58; 379/130
[58] Field of Search ................................ 379/58, 59, 60, 379/91, 111, 112, 113, 114, 116, 130, 131, 133–135

[56] References Cited

U.S. PATENT DOCUMENTS

| | | | |
|---|---|---|---|
| 4,585,904 | 4/1986 | Mincone | 379/131 |
| 4,776,003 | 10/1988 | Harris | 379/141 |
| 4,951,308 | 8/1990 | Bishop | 379/144 |
| 5,506,893 | 4/1996 | Buscher | 379/112 |
| 5,517,549 | 5/1996 | Lee | 379/114 |
| 5,517,555 | 5/1996 | Amandon | 379/114 |

Primary Examiner—Curtis Kuntz
Assistant Examiner—Vijay Shankar
Attorney, Agent, or Firm—John J. Connors; Connors & Assoc.

[57] ABSTRACT

An on demand, real time billing equipment for a user of a radio telephone employs a telephone switching platform, including an unintelligent switch and a computer, which is in communication with a radio telephone transmitting system, a local telephone transmitting system, and long distance telephone transmitting system. The computer is programed to monitor, control and rate telephone calls made by customer to tally for each separate customer the identification of each individual phone number called, the date of each individual phone number called, duration of each individual phone number called, and the cost of each individual call and provide detail billing information on demand in real time. For rented radio telephones, an access terminal is in communication with the credit authorization center at which the identification of the customer is entered. When the rented telephone is returned, a printer prints a hard copy bill that provides the phone numbers of each individual call made using the rented telephone, the date of each individual call, and duration of each individual call immediately at the deactivation of the radio telephone.

9 Claims, 3 Drawing Sheets

FIG. 4

```
CALLTRAC SYSTEM
CALLTRAC PHONE   : 5001

DATE TIME DESTINATION MN AMOUNT

04AUG.17:41   - 5001     11     055
05AUG.10:13   - 5001      1     005
05AUG.10:19   - 5001      1     005
05AUG.11:05   - 5001      1     005
05AUG.23:14  3128153330  1     005
06AUG.10:42   - 5001      1     005
06AUG.11:24  3125271430  1     005

NUMBER OF CALLS   : 7
MINUTES TOTAL     : 17
CHARGE SUBTOTAL   : 0.86
SALES TAX(8.10%)  : 0.07
CHARGE TOTAL      : 0.92
CHARGED TO CARD NO. 5472561081200106
AUTHORIZATION CODE :   003352

THANK YOU FOR USING OUR SERVICE
```

ON DEMAND REAL TIME TELEPHONE BILLING EQUIPMENT

BACKGROUND OF THE INVENTION

1. Field of the Invention

This invention relates to on demand, real time billing equipment for radio telephones.

2. Background Discussion

At present there is a problem with billing radio telephone calls. Bills are not provided in real time and on demand. Detailed monthly bills are done on a batch processing basis where the customer or user only gets a bill on a fixed date periodically. Expensive microprocessors are sometimes used to modify a radio telephone to enable it to provide a customer on demand with immediate access to billing information.

This problem is particularly acute in renting radio telephones because of insufficient information on the bill. Radio telephones are frequently available to customers of rented automobiles, taxies, and in other leasing situations. Currently, when the radio telephone is returned, the customer is required to pay a bill which is not itemized, but simply consisted of a gross dollar amount. The customer does not know identification of each individual phone number called, the date of each individual phone number called, duration of each individual phone number called, and the cost of each individual phone call. Frequently, the customer objects to the bill as being inaccurate and refuses to pay. Many potential customers refuse to rent a radio telephone because of the insufficient information on the bill.

SUMMARY OF THE INVENTION

It is the objective of this invention to provide a solution to the current deficiency in billing processes.

This invention has several features, no single one of which is solely responsible for its desirable attributes. Without limiting the scope of this invention as expressed by the claims which follow, its more prominent features will now be discussed briefly. After considering this discussion, and particularly after reading the section entitled, "DETAILED DESCRIPTION OF THE PREFERRED EMBODIMENT," one will understand how the features of this invention provide its benefits, which include (1) a bill with detailed billing information concerning the individual phone numbers called, the date of each individual phone number called, duration of each individual phone number called, and the cost of each individual call, (2) the option of renting the telephone at the rental agency or when driving the leased automobile, and (3) ease of installation and servicing of the equipment. The main advantage of this invention is that it makes all radio telephones credit card useable phones without any modification to the radio telephone, providing real time on demand billing information.

The first feature of the on demand, real time billing equipment is that it may be used with essentially any radio telephone. Typically, a customer uses a credit card to rent a radio telephone installed in an automobile, etc. or a hand held portable phone.

The second feature is that the equipment includes a telephone switching platform. A conventional switching platform may be used. This switching platform is placed in communication with a radio telephone transmitting system, a local telephone transmitting system, and a long distance telephone transmitting system. In other words, communication between the party using the telephone and the person receiving the call is established through the major common carriers.

The third feature is that the telephone switching platform includes an unintelligent switch for switching calls in the conventional manner using a conventional computer. The computer is placed in communication, for example, through a telephone line, with a credit authorization center which validates the credit of the customer. The computer is programed to monitor, control and rate telephone calls made by the customer to tally for each separate customer billing information including the identification of each individual phone number called, the date of each individual phone number called, duration of each individual phone number called, and the cost of each individual call. This information is made available immediately on demand for each separate customer.

The fourth feature is an access terminal in communication with the credit authorization center at which the identification of the customer is entered. The terminal has a printer that prints a hard copy bill when the rented telephone is returned. The bill is imprinted with the phone numbers of each individual call made using the rented telephone, the date of each individual call, duration of each individual call, and the cost of each individual call.

The fifth feature of this invention is that the rented telephone may be authorized at a remote location using the deactivated telephone by entering a special access phone number using the telephone key pad to enter the access phone number. This actuates an automatic voice prompting instrument that provides instructions over the telephone for the customer to activated the telephone.

The sixth feature is that the computer is programmed to provide separate billing for the time of radio telephone usage and the time of long distance usage.

The seventh feature of this invention is that it is not limited exclusively to rental situations, but may be used for billing monthly users of the radio telephone common carrier. In this case, the computer is directly accessed by the users, that is, either the customer of the common carrier, or the common carrier itself, or both. A telephone switching platform places the radio telephone in communication with a radio telephone transmitting system, a local telephone transmitting system, and long distance telephone transmitting system. The telephone switching platform includes, as before, an unintelligent switch and a computer with memory. The computer is programed to monitor, control and rate telephone calls made by individual users to tally the billing information for each separate user and store in the memory this billing information. This detailed billing information is made available immediately on demand for each separate user. There is an access terminal in communication with the computer that enables a user to access on demand in real time the billing information stored in the computer's memory. The computer may be in communication with a credit authorization center which validates the credit of the user.

DESCRIPTION OF THE DRAWING

The preferred embodiment of this invention, illustrating all its features, will now be discussed in detail. This embodiment depicts the novel and non-obvious on demand, real time billing equipment of this invention as shown in the accompanying drawing, which is for illustrative purposes only. This drawing includes the following figures (Figs.), with like numerals indicating like parts:

FIG. 4 depicts a typical bill provided by this invention.

DETAILED DESCRIPTION OF THE PREFERRED EMBODIMENT

Figures 1, 2:
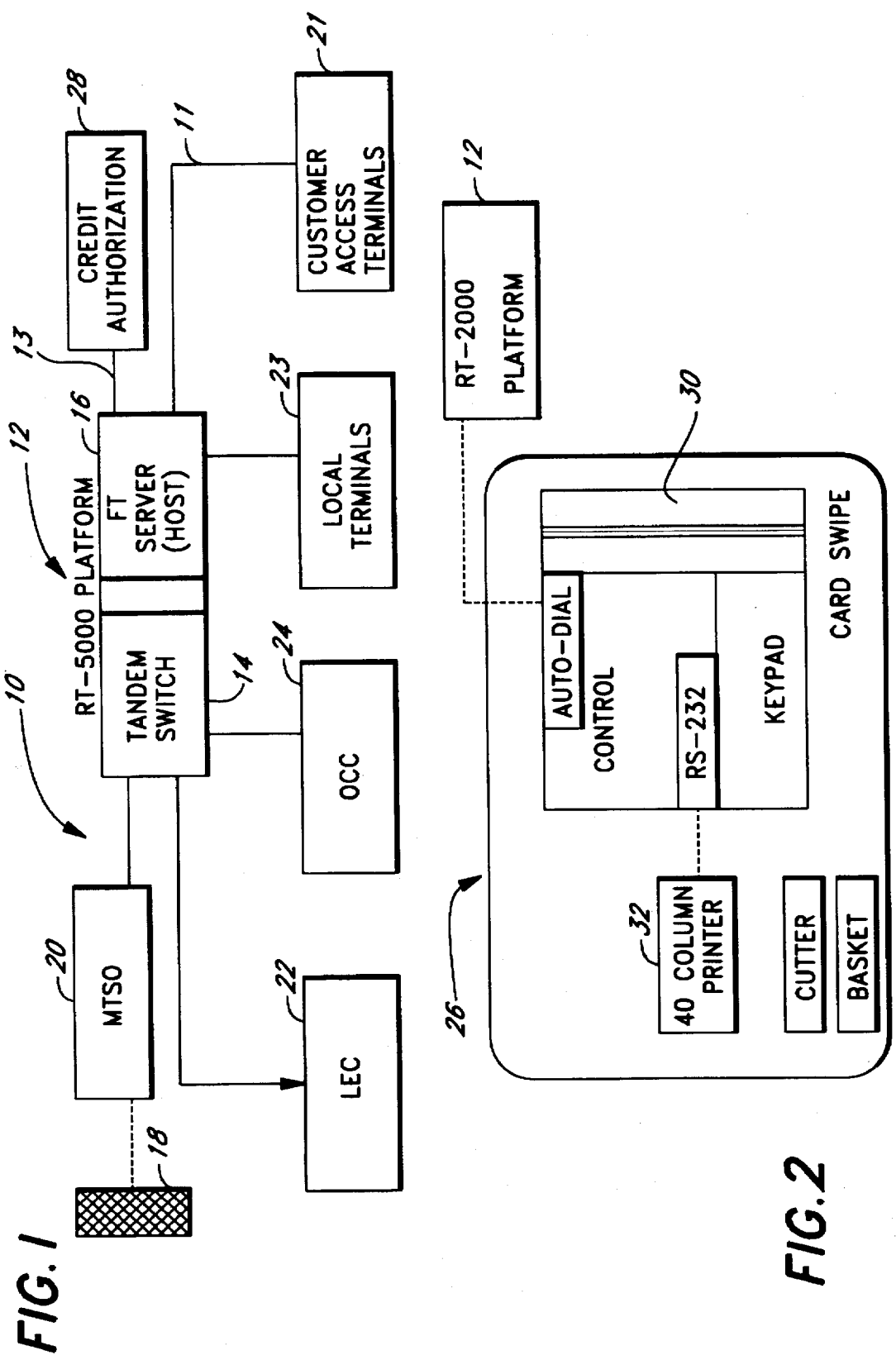
FIG. 1 is a schematic diagram of the on demand, real time billing equipment of this invention.
FIG. 2 is a schematic diagram of a kiosk used in this invention.

As shown in FIG. 1 the on demand, real time billing equipment 10 of this invention employs a conventional telephone switching platform 12 which includes an unintelligent switch 14 for switching calls in the conventional manner using a conventional host computer 16. A suitable unintelligent switch 14 is manufactured by Summa Four Corporation of Manchester, N.H., and a suitable host computer 16 is manufactured by Digital Equipment Corporation. The computer 16 has sufficient memory (not shown) to store all collected billing information.

Telephone calls from a radio telephone 18 are transmitted through a radio telephone transmitting system 20, a local telephone transmitting system 22, and long distance telephone transmitting system 24. For example, the major common carriers such as, for example, Air Touch cellular phone company, Pacific Bell phone company, and ATT long distance phone company serve to establish communication between the party initiating the call and the person receiving the call. The radio telephone 18 may be, for example, a hand held portable or installed in a car. Typically, a customer rents the telephone 18 using a credit card, or is billed on a regular periodic billing cycle.

Figure 3:
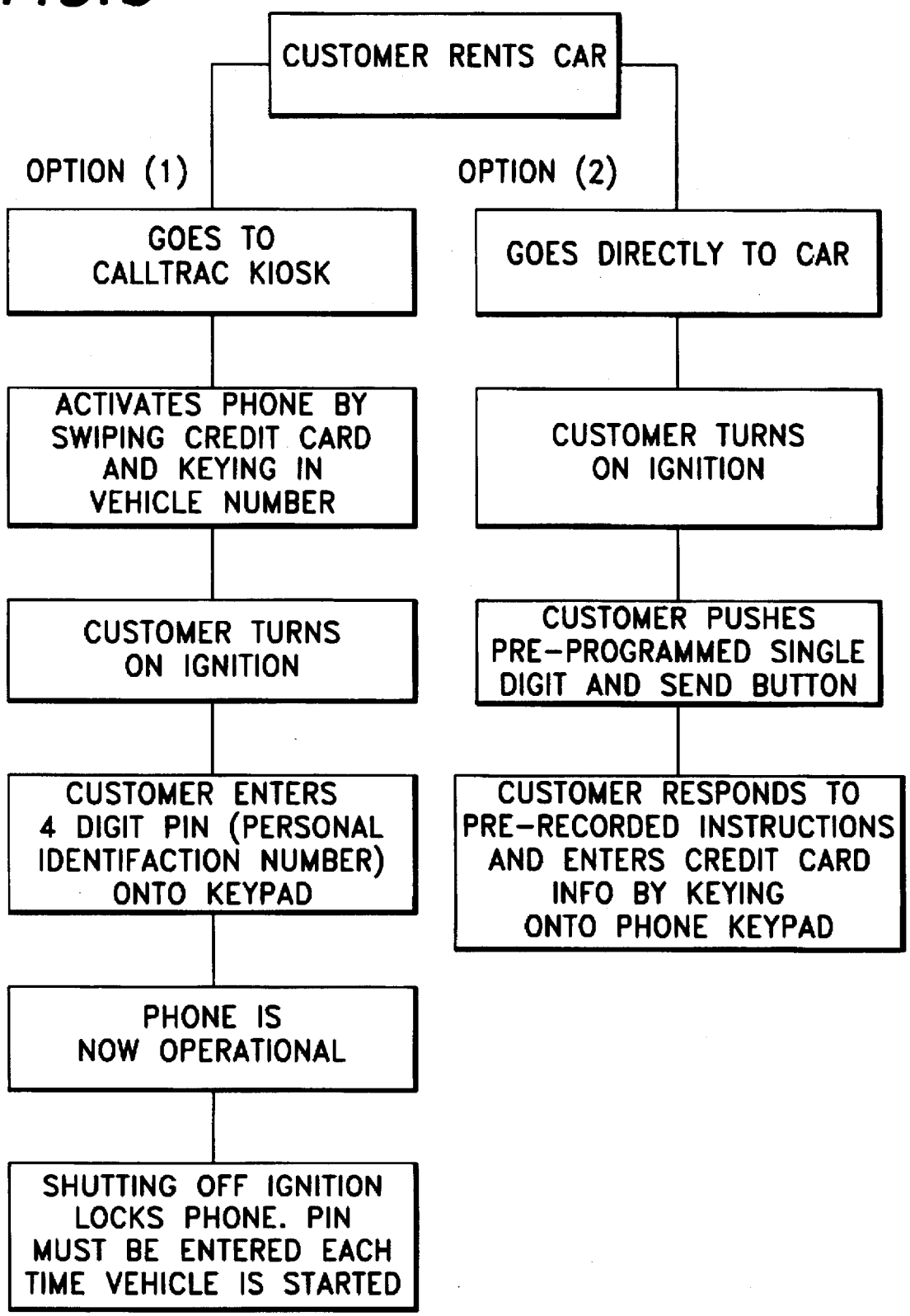
FIG. 3 a flow chart of the telephone activation and and deactivation procedures followed in this invention.

The flow chart of FIG. 3 summarizes how the telephone 18 is activated. The customer has two options. Either use the kiosk 26 at the customer access terminal 21 or from the rented telephone 18.

The customer access terminal 21 employs a kiosk 26 shown in FIG. 2 where a customer may obtain authorization for the use of the telephone 18. The kiosk 26 is in communication with a credit authorization center 28 through the computer 16. At the kiosk 26, the identification of the customer is entered, for example, by passing a credit card (not shown) through a swiper 30 at the kiosk 26. Customer information is transmitted via a telephone line 11 and the computer 16 via a telephone line 13 to the credit authorization center 28. The customer access terminal 21 is in communication with the telephone 18 through local terminals 23.

The telephone 18 may also be authorized at a remote location by entering a special access phone number using the telephone key pad (not shown) to enter the access phone number. This actuates an automatic voice prompting instrument (not shown) that provides instructions over the telephone 18 for the customer to obtain use of the equipment 10 by keying the customer's credit account number into the telephone keypad (not shown). Arbutron Corporation provides a suitable voice prompting instrument.

The kiosk 26 has a printer 32 that prints a hard copy bill 34 (FIG. 4) when the rented telephone 18 is returned. The bill 34 is imprinted with the phone numbers of each individual call made using the rented telephone, the date of each individual call, duration of each individual call, and the cost of each individual call. The computer 16 is programmed to provide separate billing for the time of radio telephone usage through the radio telephone transmitting system 20 and the time of long distance usage through the long distance telephone transmitting system 24.

The computer 16 is placed in communication through a telephone line 13 with the credit authorization center 28. If the credit of the customer is validated, the transaction is authorized and the radio telephone is activated within the equipment 10 for rental purposes. The computer 16 is programed to monitor, control and rate telephone calls made by the customer to tally for each separate customer the identification of each individual phone number called, the date of each individual phone number called, duration of each individual phone number called, and the cost of each phone call. Suitable billing software, for example, Micro EOS software provided by Micro Dimensions, Inc. of Mentor, Ohio.

SCOPE OF THE INVENTION

The above presents a description of the best mode contemplated of carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above which are fully equivalent. Consequently, it is not the intention to limit this invention to the particular embodiment disclosed. On the contrary, the intention is to cover all modifications and alternate constructions coming within the spirit and scope of the invention as generally expressed by the following claims, which particularly point out and distinctly claim the subject matter of the invention:

I claim:

1. An on demand, real time billing equipment for a customer of a rented, radio telephone, including
   an unmodified radio telephone which is unable to provide a user on demand with immediate access to billing information,
   a telephone switching platform in communication with said unmodified radio telephone and a radio telephone transmitting system, a local telephone transmitting system, and long distance telephone transmitting system,
   said telephone switching platform including an unintelligent switch and a computer in communication with a credit authorization center which validates the credit of said customer,
   said computer being programed to monitor, control and rate telephone calls made by said customer to tally for each separate customer billing information including the identification of each individual phone number called, the date of each individual phone number called, duration of each individual phone number called, and the cost of each individual call, and make available immediately on demand for each separate customer said billing information, and
   an access terminal in communication with the credit authorization center at which the identification of the customer is entered, said terminal having a printer that prints a hard copy bill when the rented telephone is returned, said bill providing the phone numbers of each individual call made using the rented telephone, the date of each individual call, and duration of each individual call.

2. The on demand, real time billing equipment of claim 1 where the telephone may be authorized at a remote location by entering a special access phone number using the telephone key pad enter the special access phone number which thereupon actuates an automatic voice prompting instrument that provides instructions over the telephone.

3. The on demand, real time billing equipment of claim 2 where the instructions include directing the customer to enter an authorized credit account number.

4. The on demand, real time billing equipment of claim 1 where the computer is programmed to provide separate billing for the time of radio telephone usage and the time of long distance usage.

5. The on demand, real time billing equipment of claim 1 where the access terminal is in communication with the credit authorization center through the computer.

6. An on demand, real time billing equipment for radio telephones, including an unmodified radio telephone which is unable to provide a user on demand with immediate access to billing information, a telephone switching platform in communication with said unmodified radio telephone and a radio telephone transmitting system, a local telephone transmitting system, and long distance telephone transmitting system, said telephone switching platform including an unintelligent switch and a computer with memory and programed to monitor, control and rate telephone calls made by individual users to tally for each separate user and store in the memory billing information including the identification of each individual phone number called, the date of each individual phone number called, duration of each individual phone number called, and the cost of each individual call, and make available immediately on demand for each separate user said billing information, and an access terminal in communication with the computer that enables a user to access on demand in real time said billing information stored in the computer.

7. The on demand, real time billing equipment of claim 6 where the computer is in communication with a credit authorization center which validates the credit of said user.

8. The on demand, real time billing equipment of claim 6 where the user is instructed upon making a call to enter an authorized credit account number.

9. A method for billing on demand, in real time radio telephone calls, including providing (a) an unmodified, radio telephone which is unable to provide a user on demand with immediate access to billing information, (b) a telephone switching platform in communication with a radio telephone transmitting system, a local telephone transmitting system, and long distance telephone transmitting system, said telephone switching platform including an unintelligent switch and a computer with memory, said computer programed to monitor, control and rate telephone calls made by individual users to tally for each separate user and store in the memory billing information including the identification of each individual phone number called, the date of each individual phone number called, duration of each individual phone number called, and the cost of each individual call, and make available immediately on demand for each separate user said billing information, and (c) an access terminal in communication with the computer that enables a user to access on demand in real time said billing information stored in the computer, and making a telephone call using the unmodified radio telephone, with said call being switched through said platform to the radio telephone transmitting system to complete the call, said call being rated in real time by the programmed computer in the platform.

* * * * *